(12) United States Patent
Farley et al.

(10) Patent No.: US 10,834,872 B2
(45) Date of Patent: Nov. 17, 2020

(54) UNLOAD SPOUT INCLINATION LIMIT ADJUST SYSTEM AND METHOD

(71) Applicant: CNH Industrial America LLC, New Holland, PA (US)

(72) Inventors: Herbert M. Farley, Elizabethtown, PA (US); Reuben J. Dise, East Earl, PA (US); Cale N. Boriack, Lititz, PA (US); Denver R. Yoder, Manheim, PA (US)

(73) Assignee: CNH INDUSTRIALL AMERICA LLC, New Holland, PA (US)

( * ) Notice: Subject to any disclaimer, the term of this patent is extended or adjusted under 35 U.S.C. 154(b) by 0 days.

(21) Appl. No.: 14/790,906

(22) Filed: Jul. 2, 2015

(65) Prior Publication Data
US 2017/0000024 A1    Jan. 5, 2017

(51) Int. Cl.
*A01D 41/12* (2006.01)
*A01D 41/127* (2006.01)
*B65G 21/14* (2006.01)
*A01D 43/08* (2006.01)

(52) U.S. Cl.
CPC ........ *A01D 41/127* (2013.01); *A01D 41/1217* (2013.01); *A01D 43/087* (2013.01)

(58) Field of Classification Search
None
See application file for complete search history.

(56) References Cited

U.S. PATENT DOCUMENTS

| | | | |
|---|---|---|---|
| 4,968,284 A | 11/1990 | Klimmer et al. | |
| 5,359,838 A * | 11/1994 | Madsen | A01D 43/073 56/14.9 |
| 5,749,783 A | 5/1998 | Pollklas | |
| 6,296,435 B1 * | 10/2001 | Wood | B60P 1/42 198/536 |
| 6,508,705 B1 * | 1/2003 | Van Overschelde | A01D 41/1226 296/15 |
| 6,943,824 B2 | 9/2005 | Alexia et al. | |
| 7,644,816 B2 * | 1/2010 | Veiga Leal | A01D 41/1217 193/22 |
| 7,938,613 B2 * | 5/2011 | Yoder | A01D 41/1217 198/550.1 |
| 8,126,620 B2 | 2/2012 | Ringwald et al. | |

(Continued)

FOREIGN PATENT DOCUMENTS

| | | |
|---|---|---|
| EP | 1297734 A1 | 4/2003 |
| EP | 2 138 027 A1 | 12/2009 |

(Continued)

OTHER PUBLICATIONS

European Search Report; 16177345.2-1655; dated Nov. 11, 2016.

*Primary Examiner* — Tan Q Nguyen
(74) *Attorney, Agent, or Firm* — Patrick Sheldrake; Peter Zacharias

(57) ABSTRACT

An unloading conveyor arrangement for an agricultural machine includes a conveyor having a discharge end, and a spout arrangement at the discharge end of the conveyor. A range for the position of the spout is determined from one or more factors such as topography and the physical characteristics of the material being handled through the conveyor. The actual position of the spout is ascertained and a warning or an adjustment is made if the actual position is not within the range.

8 Claims, 2 Drawing Sheets

(56) References Cited

U.S. PATENT DOCUMENTS

| | | | | |
|---|---|---|---|---|
| 2002/0083695 | A1* | 7/2002 | Behnke | A01B 69/008 56/119 |
| 2003/0174207 | A1* | 9/2003 | Alexia | A01D 43/073 348/89 |
| 2009/0044505 | A1* | 2/2009 | Huster | A01D 43/087 56/10.2 R |
| 2009/0272619 | A1* | 11/2009 | Leal | A01D 41/1217 193/4 |
| 2010/0266377 | A1* | 10/2010 | Yoder | A01D 41/1217 414/519 |
| 2012/0214561 | A1* | 8/2012 | Hollatz | A01D 41/1217 460/114 |
| 2012/0215394 | A1* | 8/2012 | Wang | A01D 41/1278 701/24 |
| 2012/0215409 | A1* | 8/2012 | Wang | A01D 41/1278 701/50 |
| 2013/0096782 | A1* | 4/2013 | Good | A01D 41/127 701/50 |
| 2013/0211658 | A1* | 8/2013 | Bonefas | B65G 67/24 701/28 |
| 2013/0213518 | A1 | 8/2013 | Bonefas | |
| 2014/0083556 | A1 | 3/2014 | Darr et al. | |
| 2014/0193234 | A1* | 7/2014 | Kormann | A01D 43/073 414/809 |
| 2014/0311113 | A1* | 10/2014 | Bonefas | A01D 34/001 56/10.2 R |
| 2015/0168187 | A1* | 6/2015 | Myers | G01F 1/80 73/861.73 |
| 2015/0245560 | A1* | 9/2015 | Middelberg | A01D 41/1277 460/7 |

FOREIGN PATENT DOCUMENTS

| | | |
|---|---|---|
| EP | 2510775 A1 | 10/2012 |
| EP | 2732688 A1 | 5/2014 |
| JP | 2004135589 A | 5/2004 |

\* cited by examiner

UNLOAD SPOUT INCLINATION LIMIT ADJUST SYSTEM AND METHOD

BACKGROUND OF THE INVENTION

1. Field of the Invention

The present disclosure relates to unloading conveyors for agricultural harvesters, and, more particularly, to the adjustment of spouts at the discharge ends of such unloading conveyors.

2. Description of the Related Art

Unloading grain from agricultural machines such as combine harvesters typically is accomplished using an elongate unloading conveyor. Such unloading conveyors typically are helical auger type conveyors. The conveyors have a discharge end including a discharge opening through which the grain is propelled by the operation of the conveyor. On some conveyors, the discharge opening faces longitudinally or endwardly such that the grain is propelled more longitudinally outwardly, and on others the opening faces more downwardly such that the grain is correspondingly propelled more downwardly.

Unloading conveyors may include a spout arrangement at the discharge end for guiding or directing the grain which is discharged therefrom. It is known that the spout arrangements at the discharge end of the conveyor are adjustable. When unloading grain into a grain truck or wagon, the combine and the receiving container (e.g., truck or wagon) are relatively positioned initially such that the receiving container is correctly positioned beneath the discharge opening of the unloading conveyor for receiving the flow of grain discharged therefrom. This can be relatively easy to accomplish if the combine and receiving container are stationary, but becomes more difficult if the harvester and the receiving container are moving, and the difficulty increases further if the terrain is uneven and/or sloped. Further, the grain holding capacity of many harvesters and receiving containers is quite large, and it may be necessary to vary the grain flow location to spread the grain within the receiving container to prevent spillage over the side of the receiving container.

Still further, it is desirable to have an improved capability to vary grain flow to a receiving vehicle to compensate or adjust for variances in the distance between or travel paths of the harvester and receiving vehicle, as well as elevational and angular differences. In this latter regard, to maintain productivity, it may be desired to unload while moving, with one or both of the harvester and the receiving vehicle traversing uneven terrain, and/or tilted sideward, which may require frequent adjustments in grain flow location to achieve desired grain distribution within the receiving vehicle. It may also be desirable to enhance or increase the effective length of the unloading conveyor, particularly one with a downwardly facing discharge opening, without materially increasing the physical length of the conveyor.

When operating an unloading conveyor with a fixed or pivot spout, if the operating range of the fixed or pivot spout is exceeded, the grain may not discharge properly from the conveyor. The operating ranges of the spouts are dependent on several factors such as grain properties and combine roll angles. As the unload tube increases inclination there is an increased risk of exceeding the designed operating range. Problems arise when the equipment is operated on the go on a hillside location. The reach of the spout decreases when unloading with the spout extending uphill and increases with the spout extending downhill. Without automatic control, the grain cart operator must get closer to or farther from the combine to compensate for the decreased or increased affective length.

What is needed in the art is a method to control the operating range of an unloading conveyor when operating in various crops and in elevation and angular terrain conditions.

SUMMARY OF THE INVENTION

In accordance herewith, the spout is adjusted based upon a signal or combination of signals indicative of grain properties and unload conveyor operation characteristics. The signals may include, for example, the inclination of the combine and grain material properties. The spout angle is tied to the roll angle of the combine in order to maintain the grain stream at the same distance from the machine. As the combine approaches a side hill slope, the pivot spout will automatically adjust to allow the same reach of the unload tube within the operating range.

The disclosure in one form is directed to an unloading conveyor arrangement for an agricultural machine provided with a conveyor having a discharge end, a sensor issuing a signal indicative of a factor that can impact flow of a material out of the conveyor discharge end; and a microprocessor receiving the signal and determining a range for an operating condition of the conveyor and issuing a response if an actual value of the operating condition is outside of the range.

The disclosure in another form is directed to an agricultural combine harvester provided with a chassis, a clean grain tank carried by the chassis; and an unloading conveyor arrangement in communication with the clean grain tank. The unloading conveyor arrangement includes a conveyor having a discharge end. A sensor issues a signal indicative of a factor that can impact flow of the material out of the conveyor discharge end. A microprocessor receives the signal and determines a range for adjustment of an operating condition of the conveyor arrangement based on the factor and issues a response if a value of the operating condition is outside of the range.

The disclosure in still another form is directed to a method for operating an unloading conveyor of a combine harvester. The method includes steps of operating a conveyor having a discharge spout at a discharge end thereof, sensing a factor that can impact flow of a material out of the conveyor; determining a range for the position of the spout dependent on the factor having been sensed; ascertaining the actual position of the spout; and readjusting a position of the spout if the actual position ascertained in the ascertaining step was outside of the range from the determining step.

An advantage presented hereby is that the unload conveyor can be operated more efficiently, avoiding situations in which the grain does not flow evenly and quickly at the outlet end of the conveyor.

Another advantage is that grain carts or other containers being filled by the unload conveyor can be filled more efficiently and completely.

BRIEF DESCRIPTION OF THE DRAWINGS

The above-mentioned and other features and advantages of this disclosure, and the manner of attaining them, will become more apparent and the disclosure will be better understood by reference to the following description of an embodiment of the disclosure taken in conjunction with the accompanying drawings, wherein.

Corresponding reference characters indicate corresponding parts throughout the several views. The exemplification set out herein illustrates an embodiment of the disclosure, and such exemplification is not to be construed as limiting the scope of the disclosure in any manner.

DETAILED DESCRIPTION OF THE INVENTION

Figure 1:
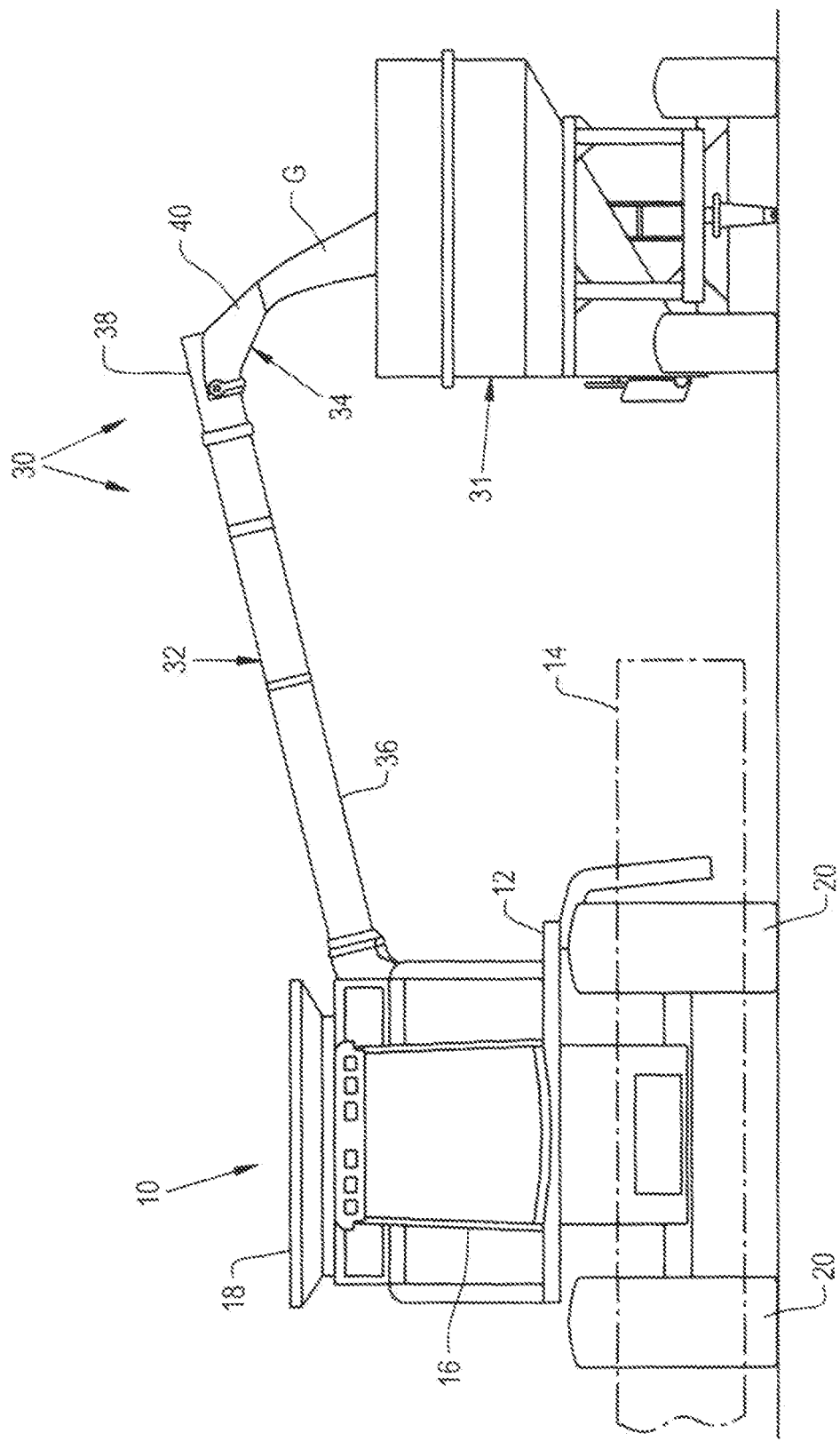
FIG. 1 is a front view of an agricultural vehicle in the form of a combine harvester including an embodiment of an unloading conveyor arrangement of the present application shown in the unloading position while unloading grain into a receiving container.

Referring now to the drawings, and more particularly to FIG. 1, there is shown a portion of an agricultural machine in the form of a combine harvester 10. Combine harvester 10 generally includes a chassis 12 which carries a number of other components such as a header 14, an operator station 16, and a clean grain tank 18. Motive force can be applied through a number of ground engaging wheels, including front drive wheels 20. It may also be possible to use driven tracks (half or full) for some applications.

According to an aspect of the system disclosed herein, combine harvester 10 also includes an unloading conveyor arrangement 30 which is operable to unload grain "G" (or other material) into a receiving container, such as a gravity wagon 31. Unloading conveyor arrangement 30 generally includes a conveyor 32 and spout arrangement 34. Conveyor 32 can be in the form of an auger with a helical flight (not shown) which is rotatably positioned within an auger tube 36. Conveyor 32 has a discharge end 38 which generally discharges grain from the axial end of conveyor 32. Discharge end 38 of conveyor 32 also can be configured to discharge the grain in a generally downward direction (e.g., with an opening at the bottom side of discharge end 38).

Spout arrangement 34 positioned at the discharge end 38 of conveyor 32 includes a spout 40 which can be connected to discharge end 38 and movable relative to conveyor 32. In the illustrated embodiment, spout 40 is pivotally movable relative to discharge end 38. Spout 40 also can be movable in different directions relative to discharge end 38, such as being movable in a translational direction or rotational direction. Movement of spout 40 can be by manual operation or motorized.

In the embodiment illustrated above, the agricultural machine is in the form of a combine harvester. It is to be appreciated that the agricultural machine could be any type of self-propelled or towed agricultural vehicle or implement, such as a grain cart with an unloading conveyor, a gravity box with an unloading conveyor, etc, depending on the need or application. When configured as a combine harvester, the material to be unloaded using the unloading conveyor arrangement 30 is grain. When configured as a different type of agricultural machine, the material to be unloaded can be a different material such as granular fertilizer or herbicide, etc.

During an unloading operation, conveyor 32 can be swung from a field storage position extending rearward to the unloading position extending to the side of combine harvester 10 (see FIG. 1). The elevation of conveyor 32 is adjusted as necessary to deposit grain G in gravity wagon 31. The position of spout 40 also can be adjusted. However, for efficient and continued operation, generally, the angular relationship of the spout should not exceed the angle of repose for the material being unloaded. If spout 40 is not properly adjusted, the departing stream quality is reduced as grain G is pushed from conveyor 32 rather than freefalling from conveyor 32. In that event, unload conveyor power demand is increased, which may exceed the operating limits. As power is being diverted to the unload conveyor, the ground drive speed of combine harvester 10 may be reduced when unloading is performed while moving through the field. With slowed ground speed harvest efficiency is reduced.

Different materials, including different crops being harvested, have different flow characteristics depending on the size, shape and other physical characteristics of the individual grain particles. Further, however, various conditions can change the free-flowing characteristic of the same material being discharged so that in some conditions, in some situations, a given angular arrangement of conveyor 32 and spout 40 can function well, while in another condition the same angular relationship can be problematic. Material properties, such as moisture, for example, and field topography can impact discharge efficiency.

Figure 2:
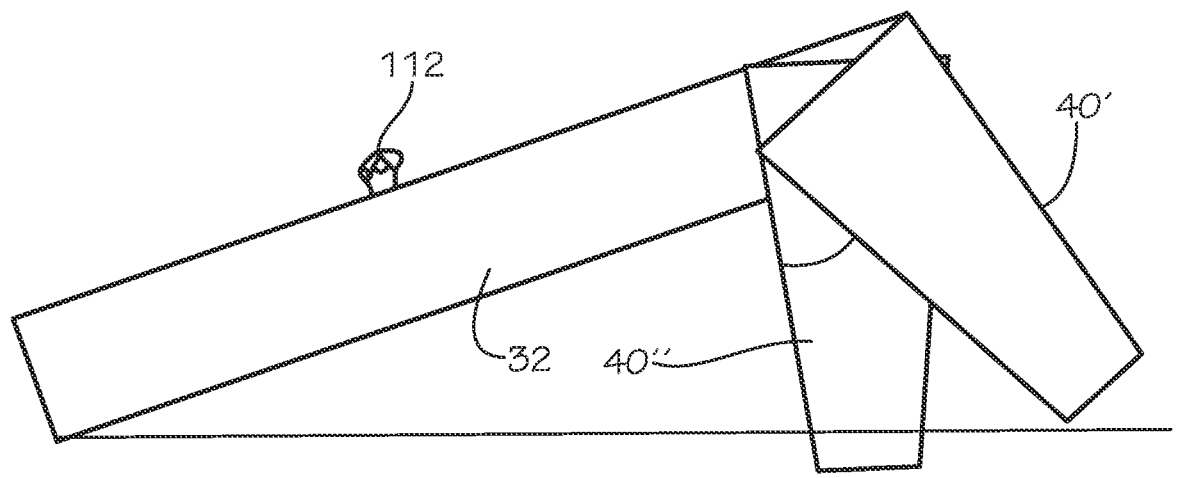
FIG. 2 is an illustration of an adjustable spout for an unloading conveyor.
Figure 3:
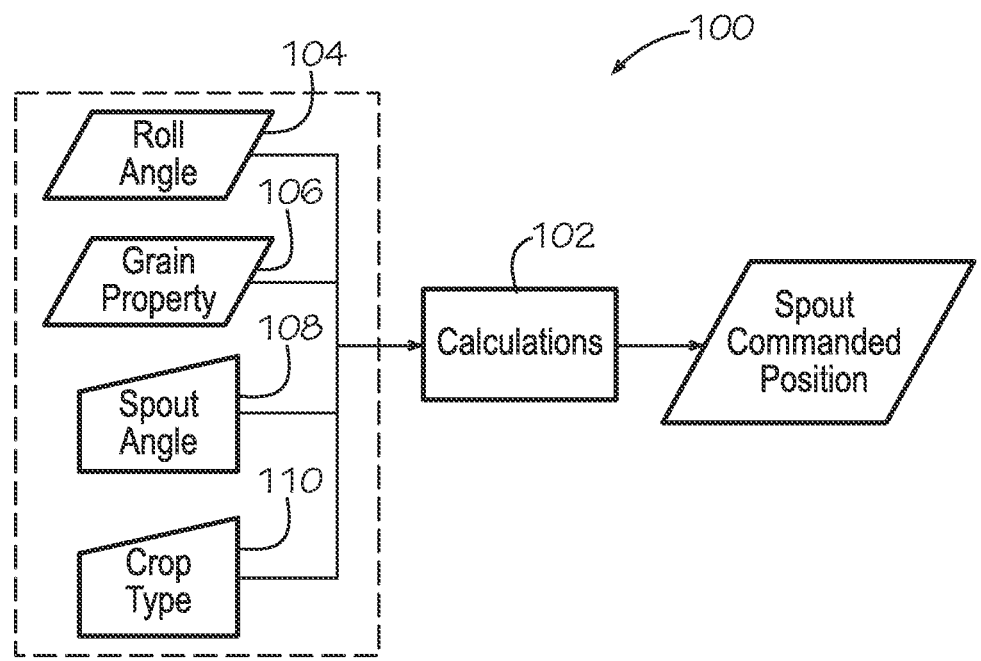
FIG. 3 is a flow chart of a method for using the system described herein.

Accordingly, method for operating an unload spout inclination limit adjust system 100 (FIG. 3) includes a microprocessor 102 performing a calculation step on data received from any of a number of sensors conveying signals indicative of conditions to microprocessor 102. By way of example, a roll angle sensor 104, a material property sensor 106, such as a grain property sensor 106, and a conveyor spout angle sensor 108 can be used. Material property sensor 106 can sense a variety of different material properties that can alter flow characteristics of the material. One example of a property that might be used advantageously is moisture. Additionally, other data is supplied to microprocessor 102, such as crop type information 110 or other data useful in in performing the calculations by microprocessor 102. It should be understood that, in modern combine harvesters, many suitable sensors are already used for other purposes, and the necessary information regarding crop characteristics is available for general combine harvester performance. Still further, data is provided to microprocessor 102 regarding field topography, which may be provided by means of a 3-D camera 112 (FIG. 2).

Microprocessor 102 uses inputs from one or more sources to calculate maximum and minimum acceptable angular orientations for spout 40. FIG. 2 illustrates a maximum angular orientation 40' and a minimum angular orientation 40". So long as the actual orientation of spout 40 is within the range bounded by the minimum 40" and maximum 40' determined to be acceptable, no action is necessary. However, if the actual orientation of spout 40 is outside of the range, the spout can be adjusted automatically to a spout commanded position (FIG. 3) when the spout arrangement 34 is of the automated type. Alternatively, a warning signal of some type can be issued to the machine operator so that an adjustment can be made before performance deteriorates and/or damage occurs.

The present system enables predictive calculations, such as when a hill is being approached while unloading occurs. Appropriate adjustments can be made before performance deteriorates. Alternatively, an unloading operation can be terminated or interrupted when the operating range is exceeded based upon an input signal or a combination of input signals and the operating range cannot be re-attained within a specified time. The system disclosed herein also can enact preventive measures quickly, and alternative features such as dithering or vibrating the spout can be used to prevent or relieve a deteriorating condition before it worsens. Further, dithering or vibrating can increase the operating range of the spout. A position actuator and/or a vibrating element would be used.

While described herein with respect to a mechanically or manually adjustable spout, it should be understood that the present system also can be used advantageously in an unloading conveyor having a fixed spout. An operator can be warned or advised when a potentially damaging condition is developing, and can take corrective and preventative action, such as terminating operation.

It should be understood that other signal inputs can be used in place of or in addition to those previously described. For example, coefficients of friction can be used successfully. A calculation of the stream content of material other than grain (MOG) can be used in that the content of MOG alters the flow characteristics of the overall stream and thereby impacts the maximum and minimum angle for efficient operation of spout 40. Still other data inputs can be used, such as drive conditions including torque feedback, vibration feedback or speed feedback; and load conditions including engine load and tire pressure can be indicative of certain conditions. All can be useful in analyzing and determining the minimum and maximum angle of operation for spout 40.

While this disclosure has been described with respect to at least one embodiment, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. An unloading conveyor arrangement for an agricultural machine, comprising:
   a conveyor having a discharge end;
   at least one sensor issuing a signal indicative of a factor that can impact flow of a material out of said conveyor discharge end;
   a microprocessor receiving said signal and determining a range for an operating condition of said conveyor and issuing a response if an actual value of said operating condition is outside of said range; and,
   wherein said conveyor includes an adjustable discharge spout, and said operating condition is the angle of said spout, and
   wherein said at least one sensor sends a signal indicative of at least one of moisture and crop type of the material and said response comprises at least one of dithering or vibrating the spout.

2. The unloading conveyor arrangement of claim 1, further comprising a sensor sending a signal indicative of topography to said microprocessor.

3. An agricultural combine harvester, comprising:
   a chassis;
   a clean grain tank carried by said chassis; and
   an unloading conveyor arrangement in communication with said clean grain tank, said unloading conveyor arrangement including a conveyor having a discharge end;
   at least one sensor issuing a signal indicative of a factor representative of a physical condition of a material that can impact flow of the material out of said conveyor discharge end; and
   a microprocessor receiving said signal and determining a range for adjustment of an operating condition of said unloading conveyor arrangement based on said factor, and issuing a response if an actual value of said operating condition is outside of said range; and
   wherein said unloading conveyor arrangement further includes an adjustable spout at said discharge end of said conveyor, and said microprocessor determines an angular range for adjustment of said spout based on said factor, and suspends unloading if an actual angular position of said spout is outside of said range and the angular position is not returned to within said range within an established period.

4. The combine harvester of claim 3, further comprising a sensor sending a signal indicative of topography to said microprocessor.

5. The combine harvester of claim 3, wherein at least a second sensor sends at least a second signal indicative of at least a second factor that can impact the flow of said material out of said conveyor discharge end; and said microprocessor receives said at least a second signal.

6. A method for operating an unloading conveyor of a combine harvester, comprising:
   operating a material conveyer that is connected to and extends from the body of the combine harvester, the material conveyer having a discharge spout at a discharge end thereof that is movable with respect to the conveyer and configured to control the angle at which material exits the conveyer;
   sensing at least one factor that can impact flow of a material out of said material conveyer;
   determining with a microprocessor an operating range for the angular position of the spout dependent on the factor having been sensed;
   controlling with the microprocessor the angular position of the discharge spout based on a roll angle of the combine harvester;
   monitoring the actual position of the spout; and
   attempting to adjust an angular position of the spout if the actual position ascertained in said ascertaining step was outside of the range from said determining step, and
   initiating a response with the microprocessor if an actual position of the spout is not returned to the range within a predetermined period;
   wherein said sensing step includes sensing at least one of moisture or crop type of the material.

7. The method of claim 6, wherein said sensing step includes sensing a topographical condition.

8. The method of claim 6, wherein said response comprises at least one of dithering or vibrating the spout or terminating unloading from the spout.

* * * * *